US012131328B2

United States Patent
Arora et al.

(10) Patent No.: US 12,131,328 B2
(45) Date of Patent: Oct. 29, 2024

(54) SYSTEMS AND METHODS FOR HYPERSPECTRAL IMAGING BASED AUTHENTICATION

(71) Applicant: BANK OF AMERICA CORPORATION, Charlotte, NC (US)

(72) Inventors: Saurabh Arora, Gurugram (IN); Sheetal Bhatia, Maharashtra (IN); Sandeep Kumar Chauhan, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 71 days.

(21) Appl. No.: 17/943,252

(22) Filed: Sep. 13, 2022

(65) Prior Publication Data
US 2024/0086924 A1 Mar. 14, 2024

(51) Int. Cl.
| | |
|---|---|
| G06Q 20/00 | (2012.01) |
| G01J 3/28 | (2006.01) |
| G06F 21/30 | (2013.01) |
| G06Q 20/04 | (2012.01) |
| G06Q 20/40 | (2012.01) |
| G06T 7/00 | (2017.01) |
| G06V 10/44 | (2022.01) |
| G06V 10/60 | (2022.01) |
| G06V 10/74 | (2022.01) |

(52) U.S. Cl.
CPC ........ *G06Q 20/4016* (2013.01); *G01J 3/2823* (2013.01); *G06F 21/30* (2013.01); *G06Q 20/042* (2013.01); *G06T 7/0002* (2013.01); *G06V 10/44* (2022.01); *G06V 10/60* (2022.01); *G06V 10/761* (2022.01); *G06T 2207/10036* (2013.01)

(58) Field of Classification Search
CPC .. G06Q 20/042; G06Q 20/4016; G06V 10/44; G06V 10/60; G06V 10/761; G06F 21/30; G06T 7/0002; G01J 3/2823
USPC .................................................. 705/4, 35–45
See application file for complete search history.

(56) References Cited

U.S. PATENT DOCUMENTS

| | | |
|---|---|---|
| 7,778,461 B2 | 8/2010 | Shi et al. |
| 8,023,694 B2 | 9/2011 | Rhoads et al. |

(Continued)

FOREIGN PATENT DOCUMENTS

| | | | | |
|---|---|---|---|---|
| KR | 20150027666 A | * | 10/2013 | ........... G06Q 20/023 |
| WO | WO-2021250537 A1 | * | 12/2021 | ........... G01J 3/0202 |

*Primary Examiner* — Bruce I Ebersman
*Assistant Examiner* — Mohammed H Mustafa
(74) *Attorney, Agent, or Firm* — Moore & Van Allen PLLC; Michael M. McCraw (57) ABSTRACT

Systems, methods, and computer program products are provided herein for hyperspectral imaging based authentication. An example method includes receiving check data associated with at least a first user and extracting one or more field details from the check data. By leveraging a hyperspectral imaging module, the method further includes generating hyperspectral image data associated with the one or more extracted field details and determining one or more spectral characteristics associated with the one or more extracted field details based on the hyperspectral image data. The method further includes determining a tampering indication for the check data based on the one or more spectral characteristics. The spectral characteristics may include one or more reflectance values associated with extracted field details across a plurality of spectral bands.

20 Claims, 5 Drawing Sheets

(56) References Cited

U.S. PATENT DOCUMENTS

| | | | |
|---|---|---|---|
| 8,160,293 B1 | 4/2012 | Fridrich et al. | |
| 8,595,503 B2 | 11/2013 | Ming | |
| 9,384,520 B2 | 7/2016 | Powers et al. | |
| 10,692,218 B2 | 6/2020 | Wang et al. | |
| 11,010,855 B2 | 5/2021 | Powers et al. | |
| 11,354,797 B2 | 6/2022 | Li et al. | |
| 2007/0258618 A1 | 11/2007 | Shi et al. | |
| 2012/0323785 A1* | 12/2012 | Elliot | G06Q 20/28 705/44 |
| 2017/0278080 A1* | 9/2017 | Kruszka | G06Q 20/4037 |
| 2018/0101751 A1 | 4/2018 | Ghosh et al. | |
| 2020/0097924 A1* | 3/2020 | Arora | G06Q 20/3829 |
| 2020/0160286 A1* | 5/2020 | Vukich | G06Q 20/0425 |

\* cited by examiner

┌─────────────────────────────────────────────────────────────────┐
│   RECEIVE CHECK DATA ASSOCIATED WITH AT LEAST A FIRST USER      │
│                            202                                   │
└─────────────────────────────────────────────────────────────────┘
                              ↓
┌─────────────────────────────────────────────────────────────────┐
│        EXTRACT ONE OR MORE FIELD DETAILS FROM THE CHECK DATA     │
│                            204                                   │
└─────────────────────────────────────────────────────────────────┘
                              ↓
┌─────────────────────────────────────────────────────────────────┐
│  GENERATE, VIA A HYPERSPECTRAL IMAGING MODULE, HYPERSPECTRAL IMAGE│
│   DATA ASSOCIATED WITH THE ONE OR MORE EXTRACTED FIELD DETAILS   │
│                            206                                   │
└─────────────────────────────────────────────────────────────────┘
                              ↓
┌─────────────────────────────────────────────────────────────────┐
│ DETERMINE ONE OR MORE SPECTRAL CHARACTERISTICS ASSOCIATED WITH THE│
│    ONE OR MORE EXTRACTED FIELD DETAILS BASED ON THE HYPERSPECTRAL │
│                         IMAGE DATA                                │
│                            208                                   │
└─────────────────────────────────────────────────────────────────┘
                              ↓
┌─────────────────────────────────────────────────────────────────┐
│  DETERMINE A TAMPERING INDICATION FOR THE CHECK DATA BASED ON THE│
│          ONE OR MORE SPECTRAL CHARACTERISTICS                    │
│                            210                                   │
└─────────────────────────────────────────────────────────────────┘
                              ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  GENERATE AN ACTIONABLE NOTIFICATION FOR PRESENTATION TO THE FIRST│
│             USER ASSOCIATED WITH THE CHECK DATA                  │
│                            212                                   │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│          IN RESPONSE TO AN AUTHORIZATION INPUT VIA THE ACTIONABLE│
│  NOTIFICATION, EFFECTUATE ONE OR MORE PAYMENT OPERATIONS DEFINED BY│
│                         THE CHECK DATA                           │
│                            214                                   │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

SYSTEMS AND METHODS FOR HYPERSPECTRAL IMAGING BASED AUTHENTICATION

TECHNOLOGICAL FIELD

Example embodiments of the present disclosure relate generally to authentication systems and, more particularly, to systems and methods for detecting and/or preventing image tampering via hyperspectral imaging techniques.

BACKGROUND

Tampering detection systems are leveraged by a variety of industries in order to ensure that the data (e.g., signals, transmissions, images, information, etc.) received by these systems is accurate. For example, tampering detection systems may operate to validate, verify, or otherwise authenticate non-cash payments, such as checks, to ensure that customers are not adversely impacted (e.g., via forgery or the like) when relying upon these forms of payment. Applicant has identified a number of deficiencies and problems associated with conventional tampering detection systems and associated methods. Through applied effort, ingenuity, and innovation, many of these identified problems have been solved by developing solutions that are included in embodiments of the present disclosure, many examples of which are described in detail herein.

BRIEF SUMMARY

Apparatuses, systems, methods, and computer program products are provided for hyperspectral imaging based authentication. In one aspect, a system for hyperspectral imaging based authentication is provided. The system may include at least one non-transitory storage device and at least one processor coupled to the at least one non-transitory storage device. The processor may be configured to receive check data associated with at least a first user and extract one or more field details from the check data. The processor may, via a hyperspectral imaging module, generate hyperspectral image data associated with the one or more extracted field details and determine one or more spectral characteristics associated with the one or more extracted field details based on the hyperspectral image data. The processor may determine a tampering indication for the check data based on the one or more spectral characteristics.

In some embodiments, the received check data may be associated with a physical check of the first user.

In some further embodiments, the at least one processor may be further configured to receive the check data in response to an image capturing operation performed by the hyperspectral imaging module.

In some embodiments, the received check data may be associated with a digital check of the first user.

In some embodiments, the at least one processor may be further configured to generate an actionable notification for presentation to the first user associated with the check data.

In some embodiments, the at least one processor may be further configured to, in response to an authorization input via the actionable notification, effectuate one or more payment operations defined by the check data.

In some embodiments, in determining the one or more spectral characteristics associated with the one or more extracted field details, the hyperspectral imaging module may be further configured to divide the hyperspectral image data into a plurality of continuous spectral bands. In such an embodiment, the one or more spectral characteristics may include a plurality of reflectance values each of which are associated with a respective extracted field detail and a respective spectral band.

In some further embodiments, in determining the tampering indication for the check data, the at least one processor may be configured to compare the reflectance values for a selected extracted field detail across the plurality of spectral bands. In an instance in which the reflectance values satisfy a tampering threshold, the processor may determine the tampering indication for the check data.

In any embodiment, the hyperspectral imaging module may include a plurality of hyperspectral imagers each configured to generate hyperspectral image data associated with the one or more extracted field details.

In another aspect, a computer program product for hyperspectral imaging based authentication is provided. The computer program product may include a non-transitory computer-readable medium including code causing an apparatus to receive check data associated with at least a first user and extract one or more field details from the check data. The computer program product may, via a hyperspectral imaging module, generate hyperspectral image data associated with the one or more extracted field details and determine one or more spectral characteristics associated with the one or more extracted field details based on the hyperspectral image data. The computer program product may determine a tampering indication for the check data based on the one or more spectral characteristics.

In yet another aspect, a method for hyperspectral imaging based authentication is provided. The method may include receiving check data associated with at least a first user and extracting one or more field details from the check data. The method may also include generating, via a hyperspectral imaging module, hyperspectral image data associated with the one or more extracted field details and determining one or more spectral characteristics associated with the one or more extracted field details based on the hyperspectral image data. The method may further include determining a tampering indication for the check data based on the one or more spectral characteristics.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below. The features, functions, and advantages that are described herein may be achieved independently in various embodiments of the present disclosure or may be combined with yet other embodiments.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data may be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships, and/or potential future relationships with an entity. In some embodiments, the user may be an employee (e.g., an associate, a project manager, an IT specialist, a manager, an administrator, an internal operations analyst, or the like) of the entity or enterprises affiliated with the entity. In some embodiments, the user may be a customer (e.g., individual, business, etc.) that transacts with the entity or enterprises associated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" or "module" may refer to core elements of an application, or part of an application that serves as a foundation for a larger piece of software and drives the functionality of the software. In some embodiments, an engine or module may be self-contained, but externally-controllable code that encapsulates powerful logic designed to perform or execute a specific type of function. In one aspect, an engine or module may be underlying source code that establishes file hierarchy, input and output methods, and how a specific part of an application interacts or communicates with other software and/or hardware. The specific components of an engine or module may vary based on the needs of the specific application as part of the larger piece of software. In some embodiments, an engine or module may be configured to retrieve resources created in other applications, which may then be ported into the engine for use during specific operational aspects of the engine. An engine or module may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," "communicably coupled" and/or the like as used herein, means that the components may be formed integrally with each other, or may be formed separately and coupled together. Furthermore, the components may be formed directly to each other, or to each other with one or more components located between the components that are operatively coupled together. Furthermore, the components may be detachable from each other, or they may permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described above, tampering detection systems are leveraged by a variety of industries in order to ensure that the data (e.g., signals, transmissions, images, information, etc.) received by these systems is accurate. For example, tampering detection systems may operate to validate, verify, or otherwise authenticate non-cash payments, such as checks, to ensure that customers are not adversely impacted (e.g., via forgery or the like) when relying upon these forms of payment. With the emergence of digital mechanisms for non-cash payments (e.g., digital check submissions), conventional systems often fail to effectively identify evidence of tampering (e.g. image tampering, digital modification or overwriting, etc.) with non-cash payments, such as checks.

Accordingly, the embodiments of the present disclosure leverage hyperspectral imaging techniques to identify the presence of a tampering indication associated with check data. For example, the embodiments described herein may, via a hyperspectral imaging module including one or more hyperspectral imaging devices, generate hyperspectral image data that includes spectral characteristics (e.g., reflectance or the like) across a plurality of continuous spectral bands. Based upon a comparison between, for example, the reflectance values of a particular extracted field (e.g., date, amount, payee, etc.) of the check data across the plurality of spectral bands, the embodiments herein may determine if a potential attempt at tampering with the check has occurred. In doing so, the embodiments of the present disclosure may provide improved tampering detection for non-cash payments relative to conventional systems, particularly when addressing the emerging mechanisms for digital payments.

Figure 1A:
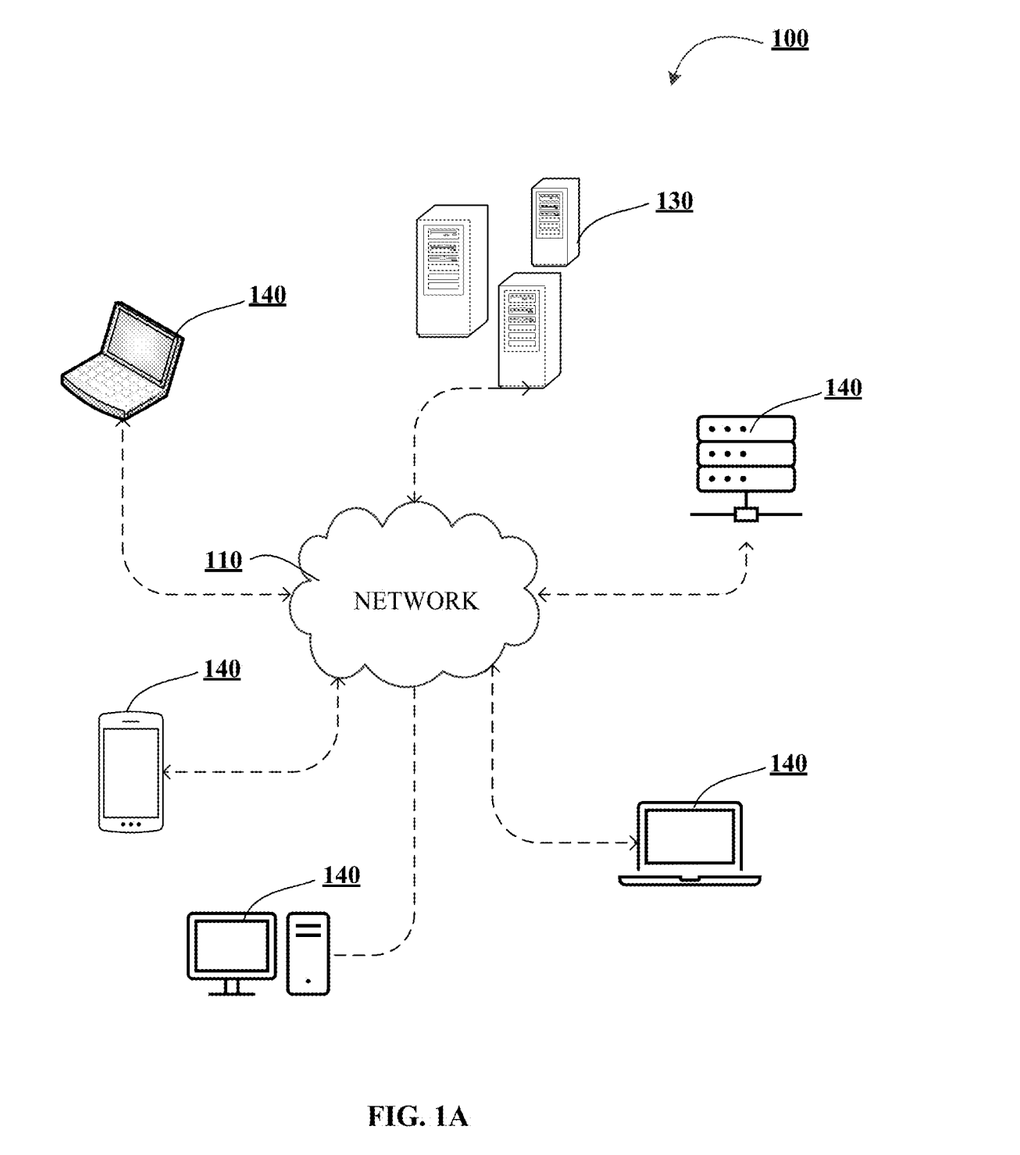
FIGS. 1A-1C illustrates technical components of an exemplary distributed computing environment for hyperspectral imaging based authentication in accordance with one or more embodiments of the present disclosure.
Figure 1B:
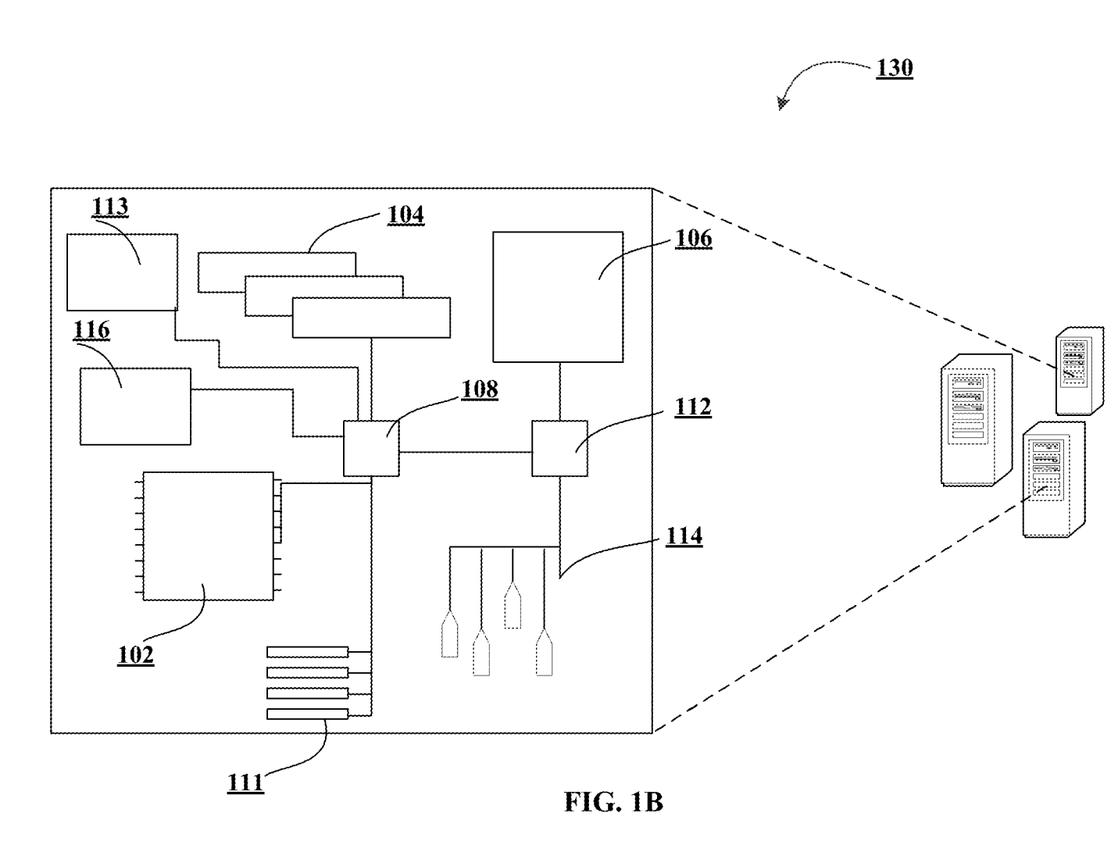
Figure 1C:
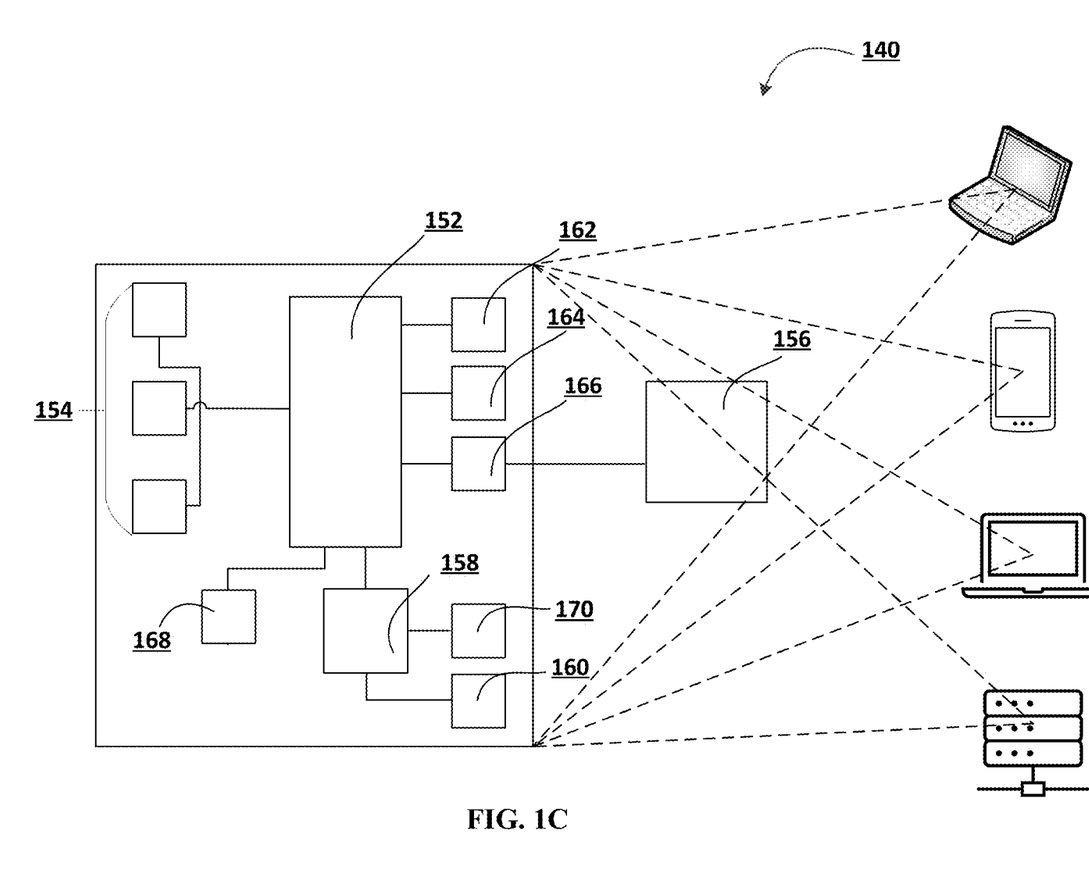

FIGS. 1A-1C illustrate technical components of an exemplary distributed computing environment for hyperspectral imaging based authentication 100, in accordance with one or more embodiments of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, the same or similar to system 130, with each system providing portions of the necessary operations (e.g., as a server bank, a group of blade servers, or a multi-processor system).

In some embodiments, the system 130 and the end-point device(s) 140 may define a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 have the same abilities to use the resources available on the network 110. As opposed to relying upon a central server (e.g., system 130) that acts as the shared drive, each device that is connected to the network 110 acts as the server for the files stored thereon.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., an automated teller machine (ATM)), and/or edge devices such as routers, routing switches, integrated access devices (IAD), and/or the like.

The network 110 may be a distributed network that is spread over different networks. This provides a single data communication network that may be managed jointly or separately by each network. In addition to shared communication within the network, the distributed network may also support distributed processing. The network 110 may be a form of digital communication network, such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the embodiments of the present disclosure. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with one or more embodiments of the present disclosure. As shown in FIG. 1B, the system 130 may include a processor 102, memory 104, input/output (I/O) device 116, a storage device 110, and a hyperspectral imaging module 113. The system 130 may also include a high-speed interface 108 connecting to the memory 104, and a low-speed interface 112 connecting to low speed bus 114 and storage device 110. Each of the components 102, 104, 108, 110, 112, and 113 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 may process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 may be capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), the hyperspectral imaging module 113, and/or to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may further include a hyperspectral imaging module 113 configured to generated hyperspectral image data indicative of a field of view (FOV) or other image capture area defined by the hyperspectral imaging module 113. In some embodiments, the hyperspectral imaging module 130 may include one or more hyperspectral imagers or imaging device each configured to generate hyperspectral image data associated with the one or more extracted field details described hereinafter. As such, the hyperspectral imaging module 113 may include any imaging devices, such as a thermal imaging camera, an infrared (IR) imager, an IR camera, a thermographic camera, and/or any device configured to generate image data that includes radiation (e.g., light) having wavelengths/frequencies outside of the visible range. Said differently, the one or more hyperspectral imaging devices leveraged by the hyperspectral imaging module 113 may capture, collect, etc. image data from across the electromagnetic range at various continuous spectral bands. In doing so, the hyperspectral imaging module 113 may determine one or more spectral characteristics (e.g., reflectance or the like) associated with the hyperspectral image data for use in subsequent tampering-related determinations. The present disclosure contemplates that the hyperspectral imaging module 113 may include any number of associated filters configured to pass/attenuate radiation (e.g., light) having particular or selected wavelengths or frequencies based upon the intended application of the system 130.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with one or more embodiments of the present disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user (e.g., an actionable notification or the like). The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 may be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker. In some embodiments, the end-point device(s) 140 may include, in whole or in part, the hyperspectral imaging module 113 or otherwise be configured to perform the operations described herein with reference to the hyperspectral imaging module 113.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here may be realized in digital electronic circuitry, integrated circuitry, specially designed ASICs (application specific integrated circuits), computer hardware, firmware, software, and/or combinations thereof.

Figure 2:
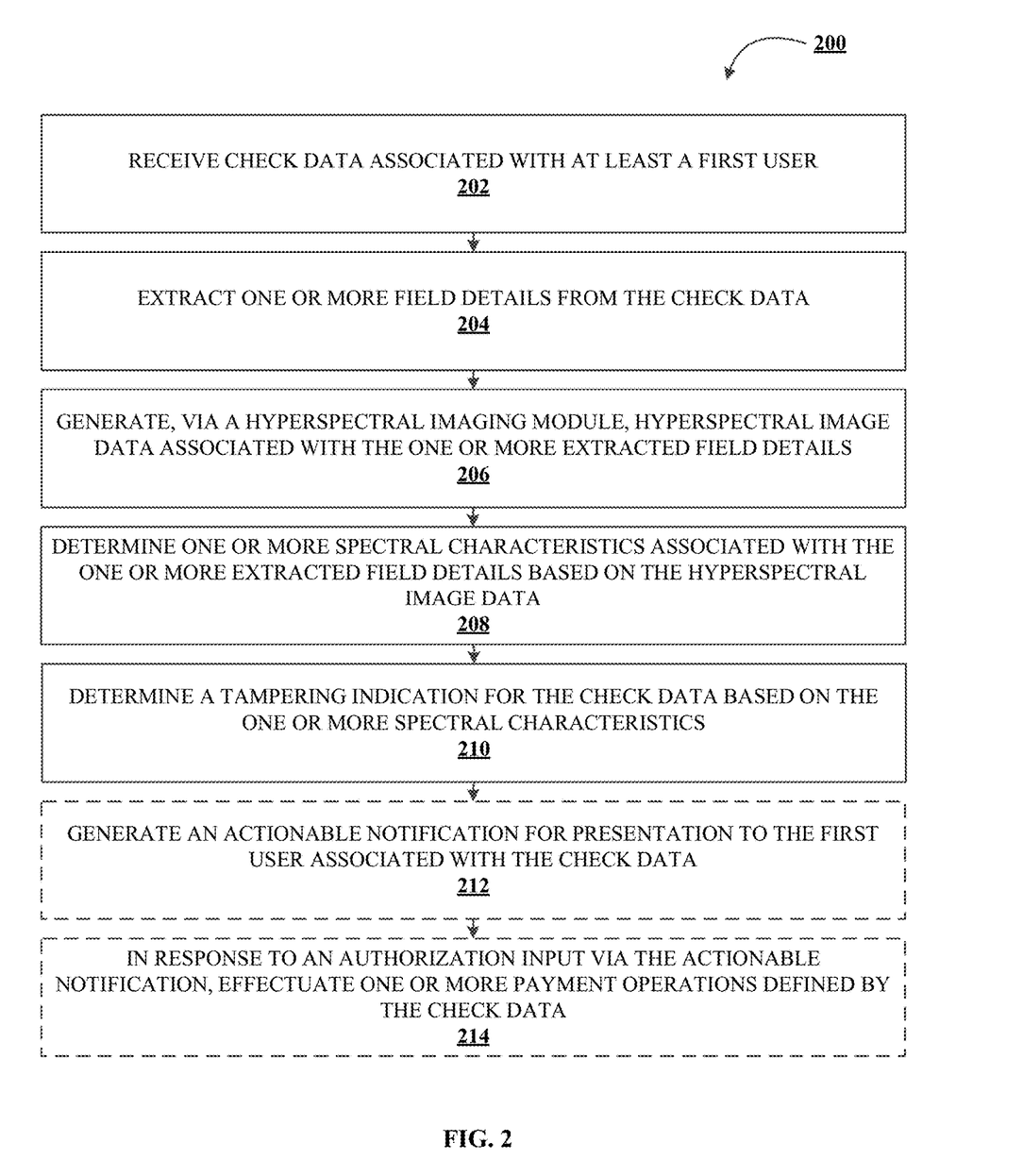
FIG. 2 illustrates a method for hyperspectral imaging based authentication in accordance with one or more embodiments of the present disclosure.

FIG. 2 illustrates a flowchart containing a series of operations for example hyperspectral imaging based authentication (e.g., method 200). The operations illustrated in FIG. 2 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, hyperspectral imaging module 113, processor 152, etc.).

As shown in operation 202, the system 130 may be configured to receive check data associated with at least a first user. As described above, the system 130 may be implemented as part of a tampering detection service or non-cash payment (e.g., check) authentication procedure such that the system 130 receives check data associated with a plurality of distinct or interrelated users. In some embodiments, the check data received at operation 202 may be associated with a physical check of a first user. By way of an example, a first user having an example account with an entity associated with the system 130 or otherwise may physically complete a check that, for example, effectuates a transaction that includes at least the first user. This physical check may be provided to the system 130 via one or more input devices, systems, or the like as described above. Although described herein with reference to a first user associated with the check data (e.g., an example payor), the present disclosure contemplates that any number of other users (e.g., an example payee) may be associated with the check data.

By way of a particular, non-limiting example, the system 130 may receive the check data at operation 202 in response to an image capturing operation performed by the hyperspectral imaging module 113. In such an embodiment, the system 130 or an end-point device 140 may include one or more hyperspectral imaging devices as defined above that may capture a hyperspectral image (e.g., generate hyperspectral image data) that includes the check data associated with, for example, a physical check. In other embodiments, the received check data may be associated with a digital check of the first user. A digital check may refer to a non-cash payment that is digitally communicated to the system 130 as opposed to a check that is physically completed and scanned by the hyperspectral imaging module 113. Said differently, the digital check may refer to a non-cash payment that is completed partially or entirely electronically. Additionally, the digital check may refer to a check that is completed physically by the first user, scanned by a conventional imaging device (e.g., a camera or the like), and then subsequently transmitted to the system 130. In any embodiment, the receipt of the check data at operation 202 may occur in response to any instruction by the system 130 and/or by operations performed by devices operably coupled with the system 130.

As shown in operation 204, the system 130 may extract one or more field details from the check data. As would be evident to one of ordinary skill in the art in light of the present disclosure, non-cash payments (e.g., checks or the like) may include a number of sections, areas, fields, etc. that are completed by an associated user in order to properly effectuate payment. By way of example, the field details of an example check (e.g., as defined by the received check data) may include a payee or name field, a date of issue field, an amount field, and/or a signature field. These field details may include any information associated with the underlying truncation to be effectuated by the check data. At operation 204, the system 130 may leverage image processing techniques or equivalent operations to extract or otherwise identify the field details of the check data so as to further evaluate these fields to detect the presence of potential tampering with the check data.

As shown in operation 206, the system 130 may, via the hyperspectral imaging module 113, generate hyperspectral image data associated with the one or more extracted field details. As described above, the hyperspectral imaging module 113 may include one or more hyperspectral imagers each configured to generate hyperspectral image data associated with the one or more extracted field details including radiation (e.g., light) having wavelengths/frequencies outside of the visible range. Said differently, the hyperspectral image data may include image data from across the electromagnetic range at various continuous spectral bands. As described further hereinafter with reference to FIG. 3, the hyperspectral imaging module may be configured to divide the hyperspectral image data into a plurality of continuous spectral bands as part of generating this data. For example, the hyperspectral imaging module 113 may capture or otherwise generate image data at a plurality of wavelengths and/or frequencies for further processing as described hereafter.

As shown in operation 208, the system 130 may further determine one or more spectral characteristics associated with the one or more extracted field details based on the hyperspectral image data. As would be evident to one of ordinary skill in the art in light of the present disclosure, the hyperspectral imaging devices leveraged by the hyperspectral imaging module 113 may generate hyperspectral image data that includes a plurality of associated parameters, characteristics, attributes, etc. In some instances, spectral characteristics (e.g., reflectance or the like) may be determined based upon this hyperspectral image data for the particular or extracted field details (e.g., the areas or portions of the check data that may be tampered with). As described hereafter with reference to FIG. 3, the spectral characteristics for each extracted field detail may be determined across a plurality of spectral bands. By way of a non-limiting example, the spectral characteristics may include at least a reflectance value indicative of the intensity at which radiation (e.g., light) is reflected from the check at each of the spectral bands (e.g. a plurality of reflectance values for each extracted field associated with respective spectral bands).

Thereafter, as shown in operation 210, the system may further determine a tampering indication for the check data based on the one or more spectral characteristics. As described above, the advent or emergence of digital payment mechanisms has further resulted in increasingly difficult to detect tampering mechanisms. For example, a physical or digital check may be completed by the first user, and, thereafter, another party may modify, augment, overwrite, or otherwise impact the validity of the check. By way of a particular, non-limiting example, another party may digitally overwrite the payee's name, the date of issuance, the amount, and/or any other field associated with the check. As described further hereafter with reference to FIG. 3, however, the embodiments of the present disclosure may determine a tampering indication indicative of such a modification of the underly check by another party based upon the spectral characteristics (e.g., reflectance or the like) associated with the extracted fields of the check data. For example, the reflectance values for the amount defined by the check data (e.g., the extracted field detail) across a plurality of wavelengths (e.g., continuous spectral bands or the like) may be compared against various thresholds to determine if a modification has occurred. For example, a reflectance value at a particular wavelength that greatly exceeds the reflectance values at a plurality of other wavelengths may be indicative of a modification or tampering (e.g., a tampering indication) for that particular field detail.

In some embodiments, as shown in operations 212 and 214, the system 130 may generate an actionable notification for presentation to the first user associated with the check data and, in response to an authorization input via the actionable notification, effectuate one or more payment operations defined by the check data. By way of example, the system 130 may determine a tampering indication for the check data as described above with reference to operations 202-210 indicative of a potential modification to the check associated with the first user. In order to authenticate, verify, or otherwise ensure that the transaction defined by the check data was intended by the first user, the system 130 may generate an actionable notification for presentation, via a user device or the like, to the first user for review. For example, the actionable notification may be presented to the first user via a mobile device of the first user and include one or more input elements configured to receive an input of the first user (e.g., an "authorize" or "refuse" input or button). In an instance in which the first user intended to complete the underlying transaction defined by the check data (e.g., the tampering indication is not indicative of modification by another party), the system 130 may effectuate one or more payment transactions or operations. For example, the system 130 may cause funds associated with the first user (e.g., held in an account of the first user or otherwise) to be disbursed or transferred to a payee (e.g., as defined by the particular field detail).

Figure 3:
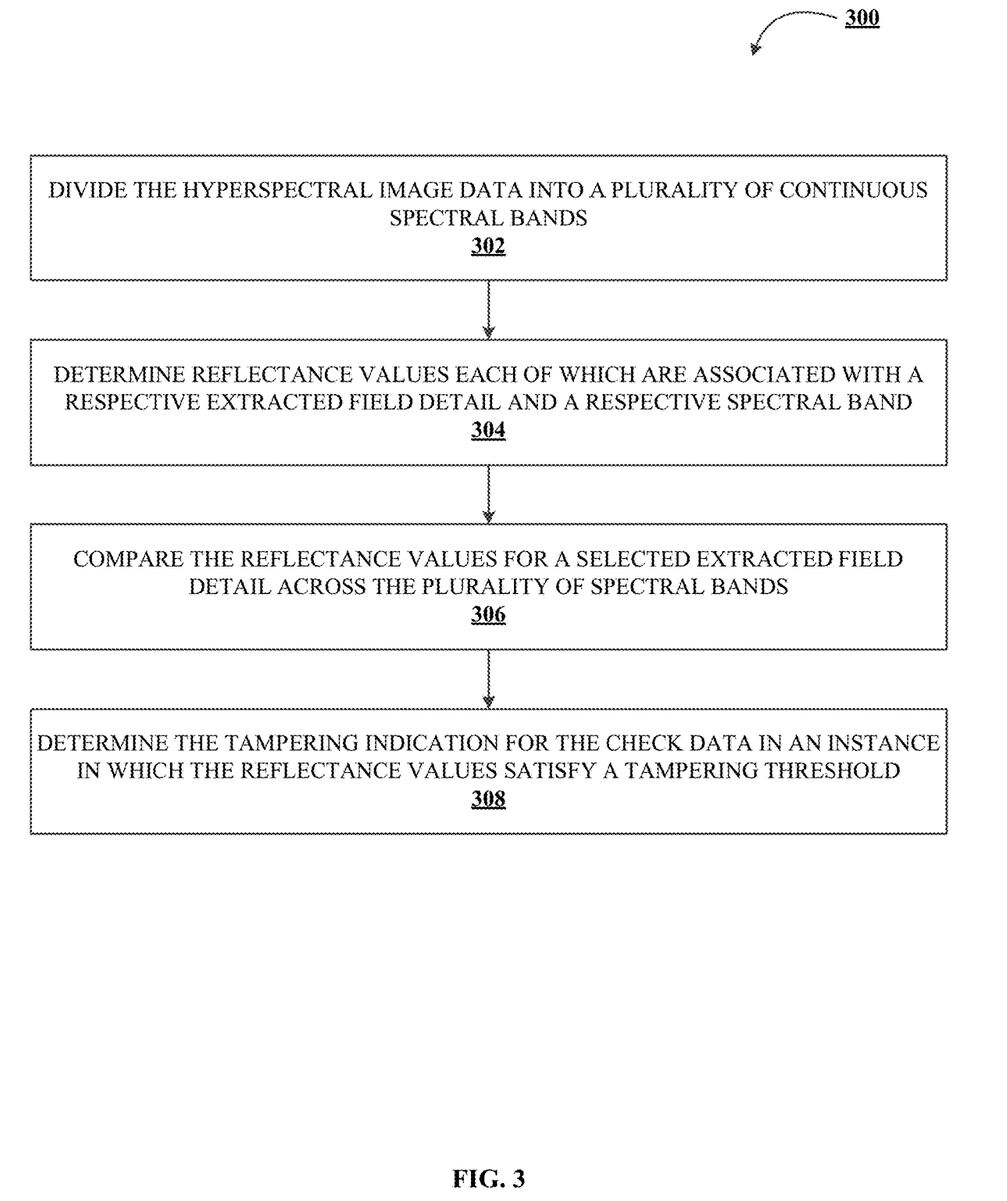
FIG. 3 illustrates a method for reflectance value comparisons for tampering indication determination.

FIG. 3 illustrates a flowchart containing a series of operations for reflectance value comparisons (e.g., method 300). The operations illustrated in FIG. 3 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, hyperspectral imaging module 113, processor 152, etc.).

As shown in operation 302, the system 130 may divide the hyperspectral image data into a plurality of continuous spectral bands. As described above, the hyperspectral image data generated by the hyperspectral imaging module 113 may include data entries that are associated with a plurality of continuous spectral bands, such as images that are captured at a plurality of different wavelengths and/or frequencies. As such, the hyperspectral image data may include various spectral characteristics for each of these spectral bands, such as a reflectance value at each wavelength or frequency. These spectral characteristics may be further associated with particular extracted field details (e.g., payee name, check amount, date of issuance, signature, etc.) as described above. Although described herein with reference to reflectance values, the present disclosure contemplates that the hyperspectral image data may include any parameter, attribute, characteristics, and/or the like at any spectral band based upon the intended application of the system 130.

Thereafter, as shown in operations 304 and 306, the system 130 may determine reflectance values each of which are associated with a respective extracted field detail and a respective spectral band and compare the reflectance values for a selected extracted field detail across the plurality of spectral bands. By way of a non-limiting example, the reflectance values at a plurality of wavelengths for the signature field detail may be compared and/or the reflectance values at a plurality of wavelengths for the payee name field detail may be compared. In some embodiments, this comparison may include performing mathematical or statistical operations (e.g., mean, median, standard deviation, etc.) between these reflectance values to, for example, identify if any particular reflectance values is substantially different from the other reflectance values for the particular field detail. The present disclosure contemplates that any operation or comparison between these values may occur based upon the intended application of the system 130.

As shown in operation 308, the system 130 may determine the tampering indication for the check data in an instance in which the reflectance values satisfy a tampering threshold. By way of continued example, the tampering threshold may refer to a standard deviation value, a percentage difference value, a difference from the mean value, and/or the like against which each of the reflectance values for the selected extracted field detail may be compared. In particular, the tampering threshold may, for example, refer to a maximum difference value from the mean or average of all reflectance values for a particular extracted field detail. In such an example, the system 130 may determine the tampering indication in an instance in which any reflectance value for the particular extracted field detail exceeds the maximum difference value from the mean. Conversely, the system 130 may not determine the tampering indication in an instance in which all reflectance values for the particular extracted field detail fail to exceed the maximum difference value from the mean. Although described herein with reference to a difference between reflectance values and the average of these reflectance values, the present disclosure contemplates that the tampering threshold may refer to any metric, value, qualitative/quantitative measurement, or the like against which the spectral characteristics (e.g., reflectance or the like) may be compared. In some embodiments, the operations described herein may be iteratively performed and/or leverage a plurality of hyperspectral imaging devices or imagers to improve the determination of the tampering indication.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that may direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments may be configured without departing from the scope and spirit of the disclosure. Therefore, it is to be understood that, within the scope of the appended claims, the disclosure may be practiced other than as specifically described herein.

What is claimed is:

1. A system for hyperspectral imaging based authentication, the system comprising:
   at least one non-transitory storage device; and
   at least one processor coupled to the at least one non-transitory storage device, wherein the at least one processor is configured to:
   receive check data associated with at least a first user;
   extract one or more field details from the check data;
   generate, via a hyperspectral imaging module, hyperspectral image data associated with the one or more extracted field details;
   determine, via the hyperspectral imaging module, one or more spectral characteristics associated with the one or more extracted field details based on the hyperspectral image data by dividing the hyperspectral image data into a plurality of continuous spectral bands, wherein the one or more spectral characteristics comprise a plurality of reflectance values each of which are associated with a respective extracted field detail and a respective spectral band;
   compare the reflectance values for a selected extracted field detail across the plurality of spectral bands; and
   determine the tampering indication for the check data in an instance in which the reflectance values satisfy a tampering threshold.

2. The system of claim 1, wherein the received check data is associated with a physical check of the first user.

3. The system of claim 2, wherein the at least one processor is further configured to receive the check data in response to an image capturing operation performed by the hyperspectral imaging module.

4. The system of claim 1, wherein the received check data is associated with a digital check of the first user.

5. The system of claim 1, wherein the at least one processor is further configured to generate an actionable notification for presentation to the first user associated with the check data.

6. The system of claim 1, wherein the at least one processor is further configured to, in response to an authorization input via the actionable notification, effectuate one or more payment operations defined by the check data.

7. The system of claim 1, wherein the hyperspectral imaging module comprises a plurality of hyperspectral imagers each configured to generate hyperspectral image data associated with the one or more extracted field details.

8. The system of claim 1, wherein the at least one processor is further configured to iteratively compare the reflectance values for the selected extracted field detail across the plurality of spectral bands.

9. A computer program product for hyperspectral imaging based authentication, the computer program product comprising a non-transitory computer-readable medium comprising code causing an apparatus to:
   receive check data associated with at least a first user;
   extract one or more field details from the check data;
   generate, via a hyperspectral imaging module, hyperspectral image data associated with the one or more extracted field details;
   determine, via the hyperspectral imaging module, one or more spectral characteristics associated with the one or more extracted field details based on the hyperspectral image data by dividing the hyperspectral image data into a plurality of continuous spectral bands, wherein the one or more spectral characteristics comprise a plurality of reflectance values each of which are associated with a respective extracted field detail and a respective spectral band;
   compare the reflectance values for a selected extracted field detail across the plurality of spectral bands; and
   determine the tampering indication for the check data in an instance in which the reflectance values satisfy a tampering threshold.

10. The computer program product of claim 9, wherein the apparatus is further configured to receive the check data in response to an image capturing operation performed by the hyperspectral imaging module.

11. The computer program product of claim 9, wherein the apparatus is further configured to generate an actionable notification for presentation to the first user associated with the check data.

12. The computer program product of claim 11, wherein the apparatus is further configured to, in response to an authorization input via the actionable notification, effectuate one or more payment operations defined by the check data.

13. The computer program product of claim 9, wherein the apparatus is further configured to iteratively compare the reflectance values for the selected extracted field detail across the plurality of spectral bands.

14. The computer program product of claim 9, wherein the hyperspectral imaging module comprises a plurality of hyperspectral imagers each configured to generate hyperspectral image data associated with the one or more extracted field details.

15. A method for hyperspectral imaging based authentication, the method comprising:
   receiving check data associated with at least a first user;

extracting one or more field details from the check data;

generating, via a hyperspectral imaging module, hyperspectral image data associated with the one or more extracted field details;

determining one or more spectral characteristics associated with the one or more extracted field details based on the hyperspectral image data by dividing the hyperspectral image data into a plurality of continuous spectral bands, wherein the one or more spectral characteristics comprise a plurality of reflectance values each of which are associated with a respective extracted field detail and a respective spectral band;

comparing the reflectance values for a selected extracted field detail across the plurality of spectral bands; and determining the tampering indication for the check data in an instance in which the reflectance values satisfy a tampering threshold.

16. The method of claim 15, wherein the check data is received in response to an image capturing operation performed by the hyperspectral imaging module.

17. The method of claim 15, further comprising generating an actionable notification for presentation to the first user associated with the check data.

18. The method of claim 17, further comprising, in response to an authorization input via the actionable notification, effectuating one or more payment operations defined by the check data.

19. The method of claim 15, further comprising iteratively comparing the reflectance values for the selected extracted field detail across the plurality of spectral bands.

20. The method of claim 15, wherein the hyperspectral imaging module comprises a plurality of hyperspectral imagers each configured to generate hyperspectral image data associated with the one or more extracted field details.

* * * * *